June 30, 1970 K. G. SCHROEDER 3,518,695

ANTENNA ARRAY MULTIFREQUENCY AND BEAM STEERING CONTROL MULTIPLEX FEED

Filed Sept. 7, 1967 3 Sheets-Sheet 1

INVENTOR.
KLAUS G. SCHROEDER

BY Moody and Kintzinger

ATTORNEYS

INVENTOR.
KLAUS G. SCHROEDER
BY Moody and Kintzinger
ATTORNEYS

INVENTOR.
KLAUS G. SCHROEDER
BY
Moody and Kutzinger
ATTORNEYS

3,518,695
ANTENNA ARRAY MULTIFREQUENCY AND BEAM STEERING CONTROL MULTIPLEX FEED

Klaus G. Schroeder, Dallas, Tex., assignor to Collins Radio Company, Cedar Rapids, Iowa, a corporation of Iowa Filed Sept. 7, 1967, Ser. No. 666,162
Int. Cl. H01q 3/26, 1/50
U.S. Cl. 343—854 9 Claims

ABSTRACT OF THE DISCLOSURE

An antenna array multifrequency multiplex feed system forming a number of different frequency signals into simultaneously transmitted discrete beams from an antenna array. This uses a plurality of combiner circuits each having a sum port output connection to a separate antenna array section individually associated therewith. Each combiner circuit also includes a plurality of signal input connections with a plurality of different signal frequency sources.

Figure 1:
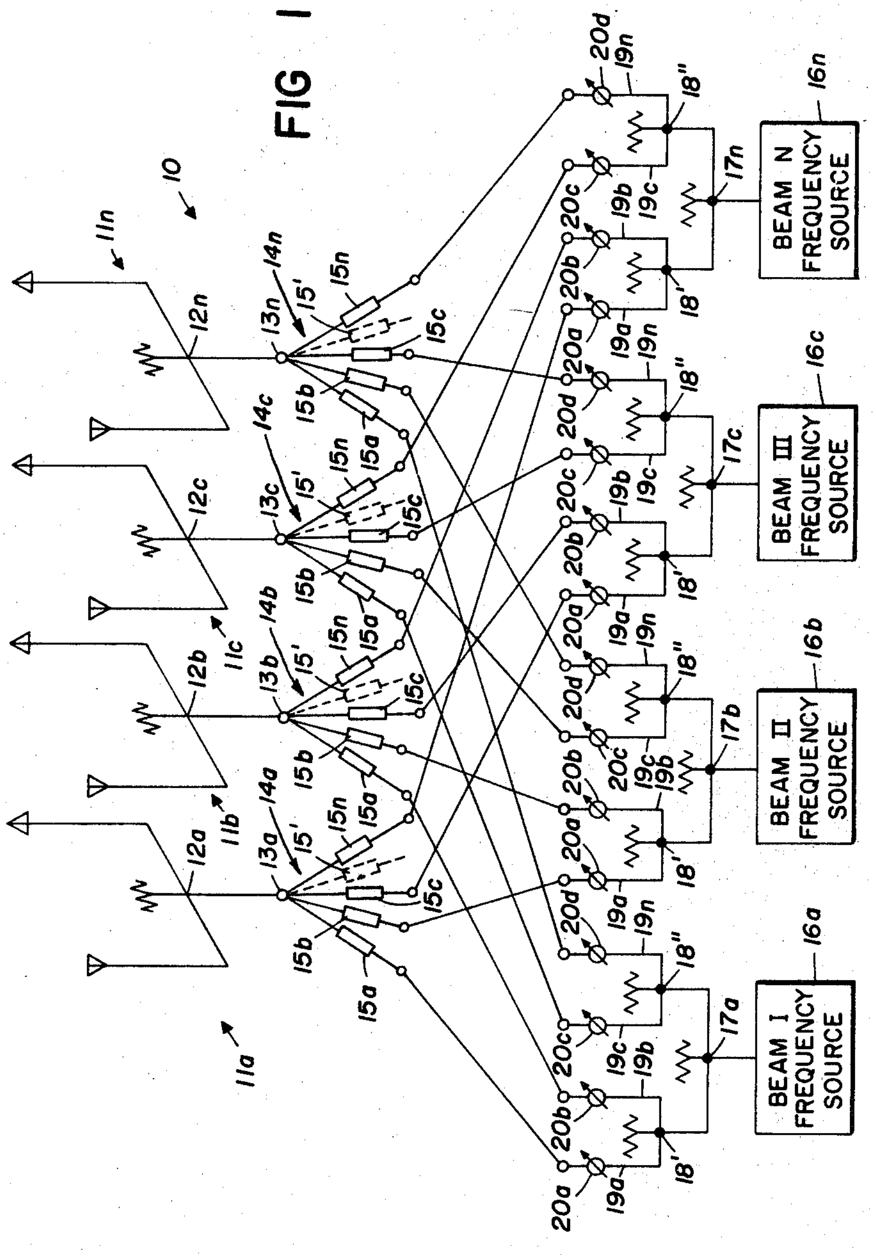

This invention relates in general to simultaneous multifrequency feed to antenna arrays, and in particular, to antenna array multifrequency and beam steering control multiplex feed systems with minimized voltage breakdown limitations and with individual beam steering control for each frequency signal transmitted.

With many systems for more fully utilizing the bandwidth capability of broadband, high gain antenna arrays, two or more frequencies are multiplexed into the same antenna with, however, the multiplexer having to operate at the full antenna power level, and with all signals having to be transmitted in the same direction. The peak voltage level appears at the multiplexer sum port and with 300 ohm open-wire systems field experience heretofore has tended to indicate that the state-of-the art voltage limit is reached with two 500 kw. carrier signals, and for the same voltage capability, combination of three 222 kw. transmitters, four 125 kw. transmitters, and so on. When lower transmission line impedances are used, the power limits are extended linearly directly with the inverse of the impedance ratio, and with, for example, a 50 ohm system tolerating six times the above power levels for the same peak signal voltage level. Obviously, the lower impedance systems must use components with adequate capacity for increased current and power levels. Further, with multiplexer circuit bandwidth for each international broadcasting frequency band being only a small percentage of the carrier frequency no tuning or bandswitching is necessary such as to require the use of sliding contacts or switches without, as a result, advantageously, increased current levels presenting any significant problems.

It is, therefore, a principal object of this invention to provide antenna array feed systems capable of handling simultaneously a plurality of different frequency signals within a predetermined bandwidth range of operation, and with voltage breakdown limitations minimized relative to increased peak combined signal power transmission from an antenna array.

A further object of such antenna array feed systems is to additionally provide individual transmitted signal beam steering control for each frequency, signal transmitted.

Features of this invention useful in accomplishing the above objects include, in various embodiments, the forming of a number of different frequency signals into simultaneously transmitted discrete beams from an antenna array through connections of the signal sources to a number of like (although not necessarily duplicate) multiplexer circuits. The sum ports of the multiplexer circuits are connected to respective antenna array elements, or element groups such as, for example, complementary pair element groups. This provides for the changing of each beam direction as desired, and with each multiplexer circuit handling only a fraction of total array power.

Specific embodiments representing what are presently regarded as the best modes of carrying out the invention are illustrated in the accompanying drawings.

Figure 2:
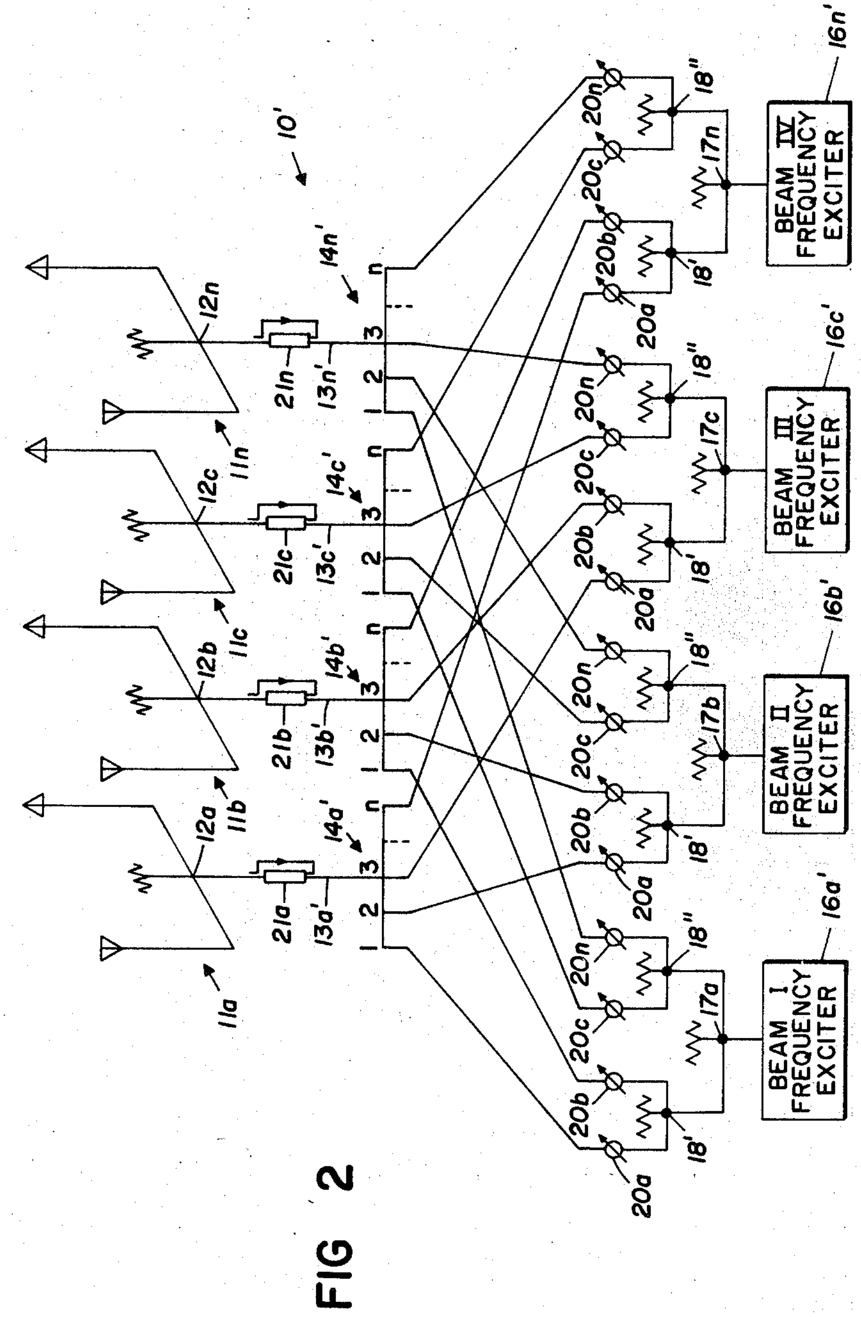
Figure 3:
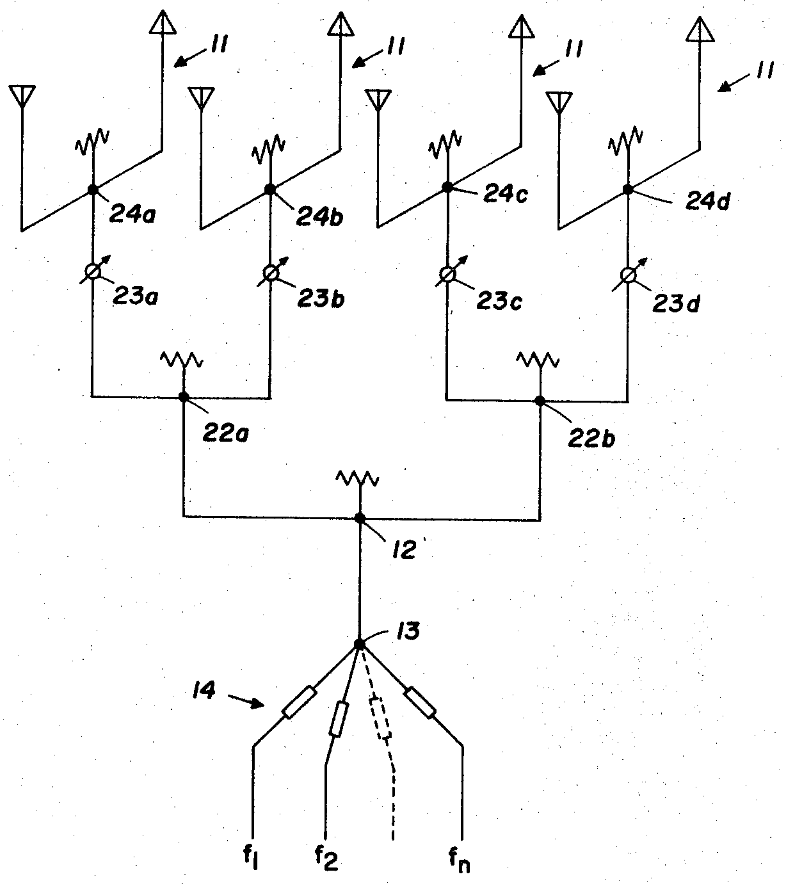

In the drawings:

FIG. 1 represents a schematic of the preferred mode embodiment showing a multibeam frequency multiplexed transmitting antenna array feed system with a plurality of frequency signal sources and a plurality of multiplexer circuits having individual sum ports connected to respective antenna array elements or sections;

FIG. 2, a schematic of an antenna array very similar in many respects to the antenna array and feed network of FIG. 1 with, however, multiplex combiner networks replacing the multiplex circuits having multiple narrow band filters of FIG. 1, and with linear power amplifiers having time delay equalization included in the connections between the sum ports of the combiners and the respective antenna array elements or sections; and, FIG. 3, a schematic of circuitry from a sum port of a multiplexer such as of the FIG. 1 embodiment including a further feed network to multiple antenna array elements that may be coplanar with other array elements of the total antenna array system or conversely arranged perpendicularly to a generally coplanar orientation of sum port feeds to the other antenna array structures in the transmitting antenna array and feed network.

Referring to the drawings:

The RF transmitting antenna array and feed system 10 of FIG. 1 includes four laterally spaced antenna groups 11*a*, 11*b*, 11*c* and 11*n* in the form of two-element complementary pair element groups interconnected by hybrid circuits 12*a*, 12*b*, 12*c* and 12*n* connected, respectively, to sum ports 13*a*, 13*b*, 13*c* and 13*n* of multiplexer circuits 14*a*, 14*b*, 14*c* and 14*n*. The four multiplexer circuits 14*a*, 14*b*, 14*c* and 14*n* are each provided with a plurality of narrow frequency bandpass filters 15*a*, 15*b*, 15*c* and 15*n* connected to frequency beam signal sources 16*a*, 16*b*, 16*c* and 16*n*, respectively. Please note that each of the multiplex circuits 14*a* through 14*n* are shown with an additional narrow bandpass filter 15' in phantom representing one or more additional narrow bandpass filters in the multiplexer circuits 14*a* through 14*n* for as many additional beam frequency signal sources as may be included for an antenna array and feed network. In the particular preferred embodiment shown in FIG. 1 four frequency beam signal sources 16*a*, 16*b*, 16*c* and 16*n* are interconnected to four multiplexer circuits 14*a*, 14*b*, 14*c* and 14*n* with the beam frequency signal sources being connected to hybrid circuits 17*a*, 17*b*, 17*c* and 17*n*, respectively. Dual ports of each of these hybrid circuits 17*a* through 17*n* are connected to additional duplicate hybrid circuits 18' and 18'' having in turn output port terminal connections 19*a*, 19*b*, 19*c* and 19*n* connected to and through adjustable or adjusted phase or delay line devices 20*a*, 20*b*, 20*c* and 20*n* to the related frequency bandpass filters 15*a*, 15*b*, 15*c* and 15*n* of the multiplex circuits 14*a*, 14*b*, 14*c* and 14*n*. Please note that with some array feed systems some frequnecy beam signal sources may be connected to only one, or if several, perhaps less than the total number of multiplexer circuits in the attainment of desired design and operational objectives.

With a multielement antenna array system and the multibeam frequency signal multiplexing feed system used therewith having fewer, the same, or more frequency beam signal sources and multiplexing circuit subunits, as the case may be, a predetermined number of discrete beams are formed at different frequencies, and then multiplexed to respective multiplexing circuit sum ports for connection to single antenna elements, or complementary pair element groups, such as shown in FIG. 1, or a more complex antenna element section such as, for example, the antenna array section of FIG. 3, discussed in greater detail hereinafter. With FIG. 1 the direction of each beam may be changed and each multiplexer circuit has to handle only a fraction of the total array power. The number of array elements may be increased to suit practically any power level with a practical limit, however, being set by the minimum azimuth beamwidth. With the same azimuth beamwidth with a single antenna array, such as represented by the structure of FIG. 3 by itself, N times the power can be handled in an array of N horizontally disposed elements or multielement sections duplicating that of the FIG. 3 showing. There is a limitation with this system in that, through the use of narrow bandpass filters, each beam can only operate in a predetermined frequency band. However, this is not a particularly serious limitation since the transmitters connected to each beam signal input can be interchanged or even switched to another antenna array whenever operation in an international broadcasting band is required falling outside the array bandwidth. Obviously, there are optimum combinations of broadband arrays, multiplexers and transmitters for achieving coverage of predetermined numbers of beam directions at specified elevation angles and with specified azimuth beamwidth. The maximum number of channels that may be conveniently handled in and through a multiplexer circuit is determined primarily by frequency spacing required for maintaining predetermined required frequency signal isolation between transmitters.

Referring now to the embodiment of FIG. 2 wherein the antenna array and feed system 10' is similar in many respects to the antenna array and feed system 10 of FIG. 1, many components the same or substantially the same are given the same or primed identification numbers as a matter of convenience and much of the operational description given for the same relative parts and those associated therewith in the embodiment of FIG. 1 would be substantially the same with the embodiment of FIG. 2. With this embodiment, however, the multiplexer circuits 14*a*, 14*b*, 14*c* and 14*n* of FIG. 1 are replaced by combiner circuits 14*a'*, 14*b'*, 14*c'* and 14*n'* in order that a number of independently phased (and weighted) relatively low power beam signal inputs be combined through the respective combiner units, that may or may not employ hybrid circuits at the combiner locations as the combiner circuits. The respective sum port connections 13*a'*, 13*b'*, 13*c'* and 13*n'* are connected to and through linear power amplifiers 21*a*, 21*b*, 21*c* and 21*n* to hybrid circuits 12*a*, 12*b*, 12*c* and 12*n*, respectively, or individual antenna array elements or sections as the case may be, respectively. While with this approach there is loss in the combiner units 14*a'*, 14*b'*, 14*c'* and 14*n'* corresponding to the number of beam signal inputs, for example, 3 db for two beams, 6 db for four beams, 9 db for eight beams and so on, it is such a low loss since the power levels are relatively low in these particular portions of the feed network that they are losses that can be readily made up at the exciter level with the relatively low power signal exciters 16*a'*, 16*b'*, 16*c'* and 16*n'* and the problem does not constitute any materially serious reduction in overall system efficiency. Just as has been symbolically indicated by output sensing to input end arrowed loops with the linear power amplifiers 21*a*, 21*b*, 21*c* and 21*n*, these driving-final amplifiers may be adjusted by individual servo loops for identical time delay from input to output. Please note that if the antenna array is operated at a single frequency the servo loop capabilities may be eliminated. For operation over a certain frequency band, the power amplifiers may be tuned but this generally limits its beams to operation at the same frequency. Conversely, if broadband amplifiers are utilized, the capability exists for utilization of beam operation on different frequencies. Since amplifier efficiency and feed network efficiency goes down as bandwidth goes up, compromises as appropriate are expedient such as utilization of amplifiers having instantaneous bandwidth over one international broadcasting band that are switched from one band to the next with, in this case, all beams being operable at different frequencies within a band.

Referring now to FIG. 3, a further modification is illustrated that may be employed with either of the embodiments of FIG. 1 or FIG. 2 in place of the complementary pair element groups 11*a*, 11*b*, 11*c* and 11*n* shown with both embodiments. With this further feed network modification the sum port 13 of a multiplexer circuit 14 with this sum port being the equivalent of one of the sum ports 13*a*, 13*b*, 13*c* or 13*n* of FIG. 1 or the connection 13*a'*, 13*b'*, 13*c'* or 13*n'* of FIG. 2 as the case may be, being connected to a hybrid circuit 12 with dual port connections to additional hybrid circuits 22*a* and 22*b*. The dual ports of the hybrid circuits 22*a* and 22*b* are connected through adjustable or adjusted phase or delay line devices 23*a*, 23*b*, 23*c* and 23*d* to hybrid circuits 24*a*, 24*b*, 24*c* and 24*d*, respectively, interconnecting the two-element complementary pair element groups 11. Please note that such more complex antenna array and feed networks from a sum port 13 would, as antenna sections, be generally in coplanar relation with respect to their effective centers. Further, they may be so oriented that individual array elements may be coplanar, or for that matter two-element complementary pair element groups as groups, may be coplanar with other array elements of the total antenna array assembly, or conversely, each subsection of the antenna array may be arranged perpendicularly to a generally coplanar orientation of the effective centers of the subsections such as that of FIG. 3 in the attainment of design and operational objectives.

Whereas this invention is here illustrated and described with respect to specific embodiments thereof, it should be realized that various changes may be made without departing from the essential contributions to the art made by the teachings hereof.

I claim:

1. In an antenna array multifrequency multiplex feed system, a plurality of combiner circuits each having a sum port output connection and multiple input connections; a plurality of antenna sections individually connected to respective sum port output connections of said combiner circuits; a plurality of different signal frequency sources connected some to respective input connections of at least one of said combiner circuits, and some in common with other signal frequency sources to more than one of said combiner circuits; wherein said combiner circuits are each a multiplexer circuit including a plurality of narrow frequency bandpass filters each having an output end connected to the sum port output connection of the respective multiplexer circuit, and each said filter having an input connection to a frequency signal source capable of producing a frequency signal passed by the filter connected thereto.

2. The antenna array multifrequency multiplex feed system of claim 1, wherein said plurality of different signal frequency sources are each connected to respective individual filters of a plurality of said multiplexer circuits.

3. The antenna array multifrequency multiplex feed system of claim 2, wherein hybrid circuits are included in the feed network connections between signal frequency sources and the filters passing the signal frequencies of respective signal frequency sources to divide signal frequency power between the multiplexer circuits each individual signal frequency source is connected to.

4. The antenna array multifrequency multiplex feed system of claim 3, wherein delay line devices are included in feed circuit connections between said filters and said hybrid circuits.

5. The antenna array multifrequency multiplex feed system of claim 2, wherein said signal frequency sources are relatively high power signal frequency sources.

6. In an antenna array multifrequency multiplex feed system, a plurality of combiner circuits each having a sum port output connection and multiple input connections; a plurality of antenna sections individually connected to respective sum port output connections of said combiner circuits; a plurality of different signal frequency sources connected some to respective input connections of at least one of said combiner circuits, and some in common with other signal frequency sources to more than one of said combiner circuits; wherein each combiner circuit has a sum port output connection to and through a power amplifier to one of said antenna sections.

7. The antenna array multifrequency multiplex feed system of claim 6, wherein said signal frequency sources are relatively low power frequency exciters.

8. The antenna array multifrequency multiplex feed system of claim 7, wherein hybrid circuit means is included between the frequency exciters and said combiner circuits; and delay line devices are included in feed circuit connections between the hybrid circuit means and said combiner circuits.

9. The antenna array multifrequency multiplex feed system of claim 8, wherein said power amplifiers are linear power amplifiers equipped with servo loops capable of providing substantially uniform time delay from input to output.

References Cited

UNITED STATES PATENTS

| | | | |
|---|---|---|---|
| 3,380,053 | 4/1968 | Connolly | 343—854 X |
| 3,255,450 | 6/1966 | Butler | 343—854 X |
| 3,308,465 | 3/1967 | Tomomo | 343—854 X |

HERMAN K. SAALBACH, Primary Examiner

T. VEZEAU, Assistant Examiner

U.S. Cl. X.R.

343—858